United States Patent [19]

Oertley

[11] Patent Number: 5,752,574
[45] Date of Patent: May 19, 1998

[54] TRACK-TYPE MACHINE UNDERCARRIAGE

[75] Inventor: Thomas E. Oertley, Dunlap, Ill.

[73] Assignee: Caterpillar Inc., Peoria, Ill.

[21] Appl. No.: 292,984

[22] Filed: Aug. 19, 1994

[51] Int. Cl.$^6$ .................. B62D 55/00; B62D 55/14
[52] U.S. Cl. .................. 180/9.5; 180/9.1; 305/129; 305/138
[58] Field of Search .................. 180/9.1, 9.5, 9.52, 180/9.6; 305/116, 131, 132, 138, 141, 137, 124, 125, 136, 130, 60

[56] References Cited

U.S. PATENT DOCUMENTS

| | | | |
|---|---|---|---|
| 1,480,693 | 1/1924 | Rackham et al. | 305/141 |
| 1,506,431 | 8/1924 | Kegresse | 305/141 |
| 1,515,167 | 11/1924 | Penn | 305/141 |
| 1,683,407 | 9/1928 | Penn | 305/132 |
| 1,725,817 | 8/1929 | Mitchell | 305/132 |
| 1,941,011 | 12/1933 | Johnston | 305/9 |
| 2,605,146 | 7/1952 | Allen | 305/125 |
| 3,278,386 | 9/1966 | Bexten | 305/29 |
| 3,412,821 | 11/1968 | Humphrey | 305/141 |
| 3,576,226 | 4/1971 | Copeland | 180/9.5 |
| 3,825,088 | 7/1974 | Copeland | 180/9.5 |
| 3,889,769 | 6/1975 | Blomstrom et al. | 180/9.5 |
| 3,980,149 | 9/1976 | Blomstrom et al. | 180/9.5 |
| 4,018,295 | 4/1977 | Hasselbacher | 180/9.5 |
| 4,324,303 | 4/1982 | Balzer et al. | 180/9.5 |
| 4,364,443 | 12/1982 | Sato et al. | 180/9.5 |
| 4,647,116 | 3/1987 | Trask | 305/138 |
| 5,279,377 | 1/1994 | Oertley | 180/9.5 |
| 5,333,710 | 8/1994 | Oertley | 180/9.5 |
| 5,358,064 | 10/1994 | Oertley | 180/9.5 |
| 5,409,305 | 4/1995 | Nagorcka | 305/32 |

FOREIGN PATENT DOCUMENTS 40-4046877  2/1992  Japan .................. 305/29

*Primary Examiner*—Anne Marie Boehler
*Attorney, Agent, or Firm*—William C. Perry; Claude F. White

[57] ABSTRACT

An undercarriage structure for a track-type machine has first and second spaced apart track roller frame assemblies which are positioned adjacent and parallel to the longitudinally extending centerline of the machine. A plurality of first and second track guiding rollers are connected to the respective roller frame assemblies and the axis of rotation of each guide roller is substantially non-perpendicular to the longitudinally extending centerline. This arrangement produces either "toe-out" or "toe-in" of the guide rollers, which results in the links of the track chain assembly contacting the track rollers in different areas as the machine travels in forward and then reverse directions. The wear life of the undercarriage structure is thereby prolonged.

8 Claims, 5 Drawing Sheets

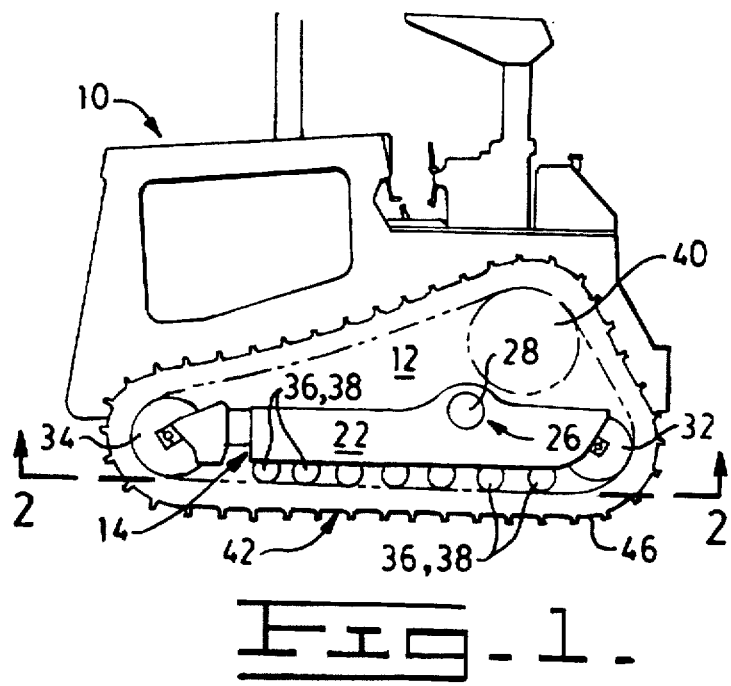
Fig_1_
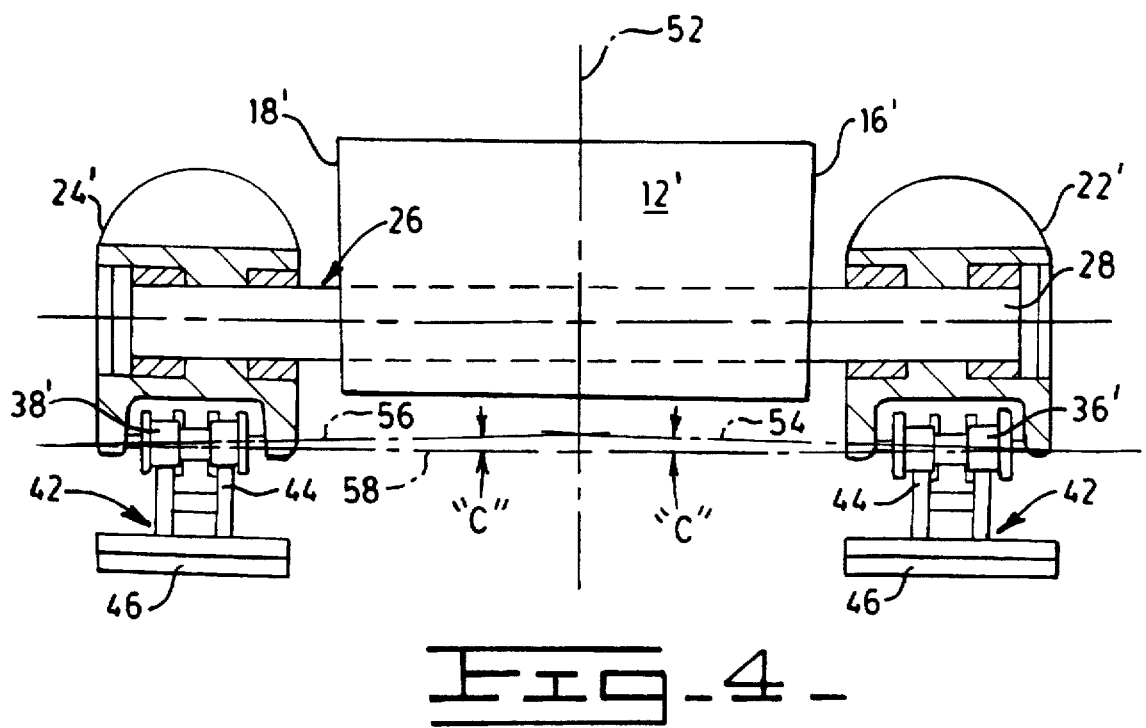
Fig_4_

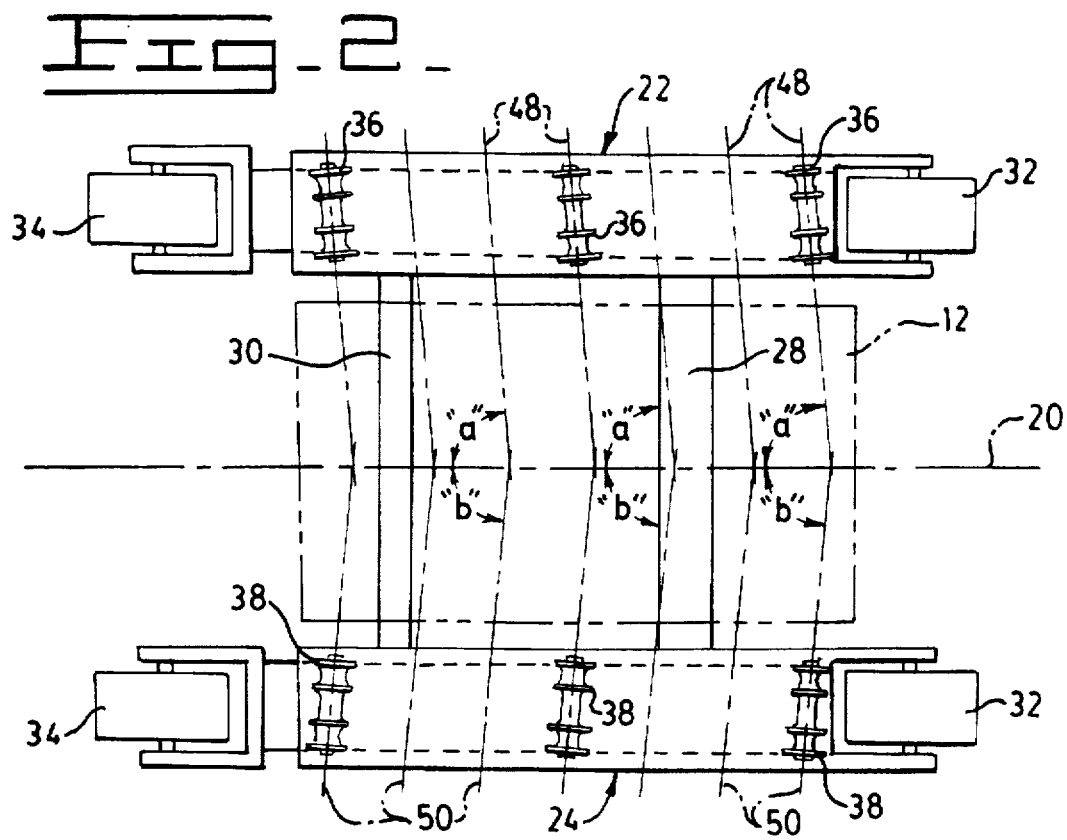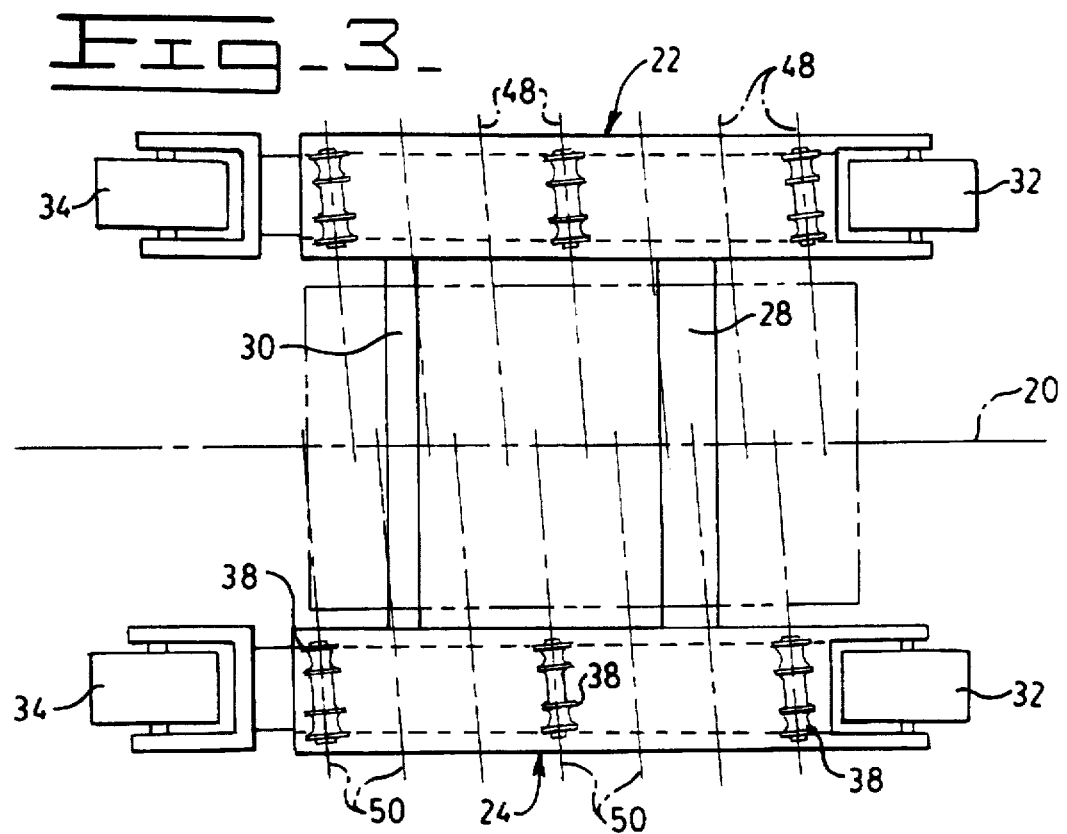

TRACK-TYPE MACHINE UNDERCARRIAGE

TECHNICAL FIELD

This invention relates generally to an undercarriage structure for a track-type machine and more particularly to an improved undercarriage structure which provides an increase in the wear life of certain undercarriage components.

BACKGROUND ART

Current and prior designs of undercarriage structures for track-type machines use design and manufacturing practices which require that the individual left and right track assemblies be parallel with each other. Tight manufacturing and assembly tolerances ensure that the left and right track assemblies are held parallel. This is done in the belief that excessive wear of the track guiding components will occur if the track assemblies are not maintained in parallel relationship. However, with the left and right track assemblies held parallel, the track links bear against the mating track roller treads in a very precise location. As the mating surfaces of the links and rollers wear, the contacting surfaces assume wear profiles which exactly match each other. Therefore, continued operation of the moving undercarriage structure produces wear along the entire contacting surfaces of the links and rollers.

The present invention is directed to overcoming one or more of the problems as set forth above.

DISCLOSURE OF THE INVENTION

In one aspect of the invention, a track-type machine has a main frame having a longitudinal centerline and an undercarriage structure which includes first and second track roller frame assemblies spaced from and adjacent the main frame. The undercarriage includes a plurality of first and second track guiding rollers connected to the respective first and second roller frame assemblies. Each of the track guiding rollers has an axis of rotation which is substantially non-perpendicular to the longitudinal centerline.

Rapid wear of the moving undercarriage components of self-laying track-type machines is a major concern of owners and operators of these machines. Many different fixes have been suggested and tried in order to extend the wear life of the moving undercarriage components. These include various guards and shields, various types of replaceable roller treads, and the use of hard materials imbedded in the roller treads and link surfaces. Although some of these fixes have had limited success, most have not proved feasible or economical.

The subject invention provides an undercarriage structure which prolongs the wear life of certain moving components. This is accomplished by ensuring that the mating wear surfaces of the moving components have more than a single wear path during operation of the machine and undercarriage structure.

BRIEF DESCRIPTION OF THE DRAWINGS

FIG. 1 is a diagrammatic side elevational view of a track-type machine incorporating the subject invention;

FIG. 2 a diagrammatic plan view taken generally along the lines 2—2 of FIG. 1;

FIG. 3 is a diagrammatic plan view similar to FIG. 2 and showing an alternate embodiment of the invention;

FIG. 4 is a diagrammatic real elevational view of a main frame and undercarriage assembly of a track-type machine showing another alternate embodiment of the invention;

BEST MODE FOR CARRYING OUT THE INVENTION

Figure 5:
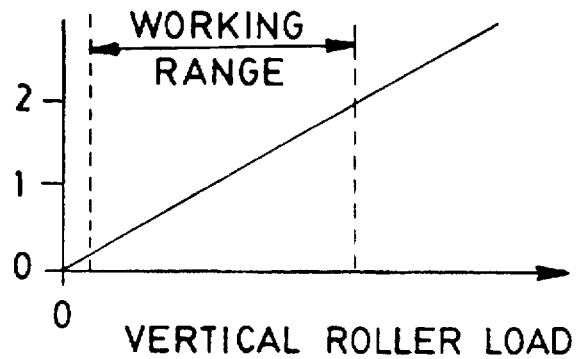
FIG. 5 is a graphic chart illustrating the positive camber angle of a prior art track-type machine.

Referring to the drawings, a track-type machine 10 has a main frame 12 and an undercarriage structure 14. The main frame 12 has first and second sides 16, 18 and a longitudinally extending centerline 20, and the undercarriage structure 14 includes first and second track roller frame assemblies 22, 24 which are spaced from and adjacent respective first and second sides 16, 18 of the main frame 12. Each of the track roller frame assemblies 22, 24 is substantially parallel to the longitudinally extending centerline 20. A supporting structure 26 connects each of the track roller frame assemblies 22, 24 to the main frame 12. The supporting structure 26 can take many forms and may include one or more pivot shafts 28 and an equalizer bar 30. Each of the track roller frame assemblies 22, 24 includes first and second idler wheels 32, 34, and a plurality of first and second track guiding rollers 36, 38 rotatably connected to respective first and second track roller frame assemblies 22, 24. A drive sprocket wheel 40 is positioned on each side of the machine 10 and is powered in forward and reverse directions by the machine 10. An endless track chain assembly 42 encircles each drive sprocket 40, the first and second idler wheels 32, 34, and the guiding rollers 36, 38. The track chain assembly 42 includes a plurality of inter-connected track links 44 and a plurality of track shoes 46 secured to the track links 44. The guide rollers 36, 38 guide the track links 44 as the track chain assembly 42 is driven by the drive sprocket 40.

With particular reference to FIGS. 1 and 2, each of the first track guiding rollers 36 has an axis of rotation 48 which is substantially non-perpendicular to the longitudinal centerline 20 of the main frame 12, and each of the track guiding rollers 38 has an axis of rotation 50 which is also substantially non-perpendicular to the longitudinal centerline 20. Each axis of rotation 48 forms a first acute angle "a" with the longitudinal centerline 20 and each axis of rotation 50 forms a second acute angle "b" with the longitudinal centerline 20. The acute angle "a" is preferably substantially equal to the acute angle "b". The non-perpendicular relationship of the axes of rotations 48, 50 with the longitudinal centerline 20 will produce lateral thrust loads between the track guiding rollers 36, 38 and the track links 44 which is characterized by a condition known as "toe out". The rollers 36, 38 can also be positioned to provide a "toe-in" condition and produce similar advantageous results.

With particular reference to FIGS. 1 and 3, an alternate embodiment of the invention is shown. In this embodiment, the axis of rotation of the first track guiding rollers 36 and the axis of rotation 50 of the second track guiding rollers 38 are still substantially non-perpendicular to the longitudinal centerline 20. However, in this embodiment, the axes of rotation 48 are substantially parallel to the axes of rotation 50. Although the first and second idler wheels 32, 34 in FIGS. 2 and 3 are shown substantially parallel to the longitudinally extending centerline 20, the axis of rotation of the idler wheels 32, 34 can also be canted, or non-perpendicular, to the centerline 20. This would produce a similar "toe-out" or "toe-in" condition and provide the advantageous wear patterns.

With particular reference to FIGS. 1 and 4, a second alternate embodiment of the invention is shown. In this embodiment, the main frame 12' has a vertically oriented centerline 52, when viewed in a vertical plane. The first and second track roller frame assemblies 22', 24' are positioned adjacent respective first and second sides 16', 18' of the main frame 12' and are substantially parallel to the vertically oriented centerline 52. A plurality of first track guiding rollers 36' are rotatably connected to the first track roller frame assembly 22' and a plurality of second track guiding rollers 38' are rotatably connected to the second track roller frame assembly 24'. Each of the first guiding rollers 36' has an axis of rotation 54 and each of the second guiding rollers 38' has an axis of rotation 56. The axes of rotation 54, 56 are all substantially non-perpendicular to the vertically oriented centerline 52.

This arrangement produces a camber angle which alternates between negative and positive. The camber angle is defined as the angle between an imaginary horizontal axis 58, which is perpendicular to the machine vertical centerline 52, and axes of rotation 54, 56 of the first and second guiding rollers. Each of the axes of rotation 54, 56 forms an acute camber angle "c" with the imaginary horizontal axis 58. The angle "C" is preferably in the range of 0.05 to 2.0 degrees. Most prior designs of undercarriage structures are constructed to provide a positive camber angle, which is illustrated in the graphic chart of FIG. 5. Such a constant positive camber angle causes the track chain assembly 42 to be biased toward the outside of the machine 10, and the track links 44 will run to one side of the guide rollers 34, 36. This produces a wear pattern on the tread portions 60 of the guide rollers 34, 36 similar to that shown in FIG. 7.

Figure 6:
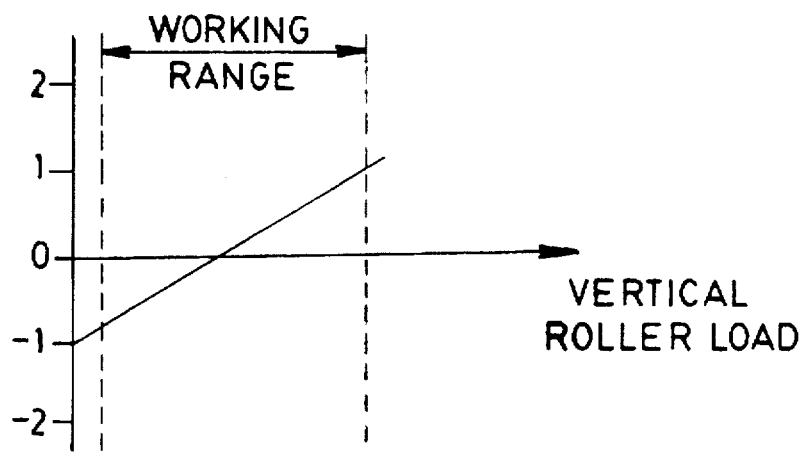
FIG. 6 is a graphic chart illustrating the negative camber angle of the present invention.
Figure 7:
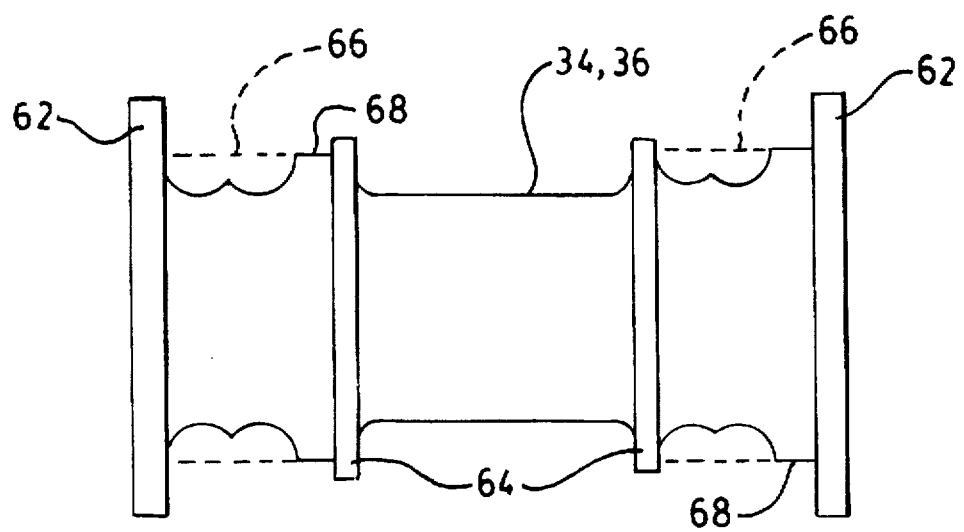
FIG. 7 is a diagrammatic plan view of a track roller showing a wear pattern of a prior art undercarriage assembly.
Figure 8:
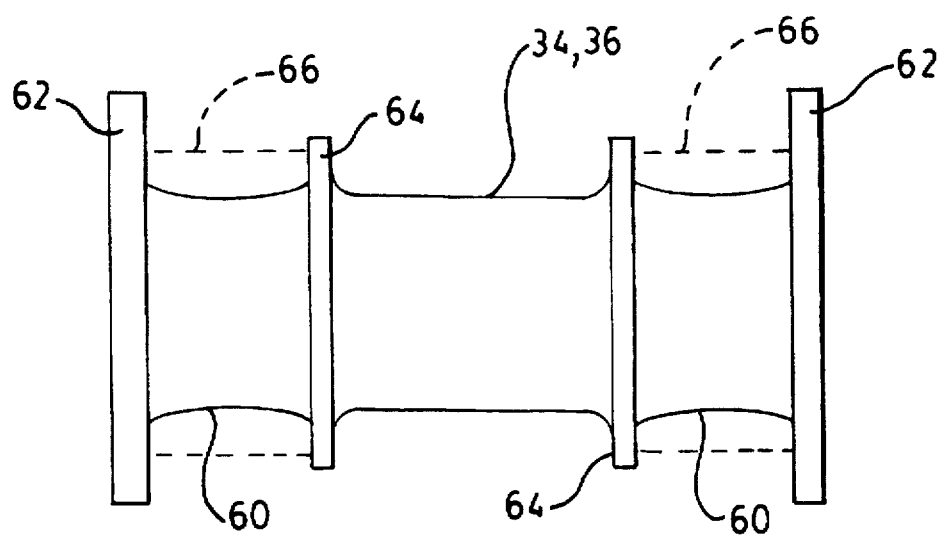
FIG. 8 is a diagrammatic plan view of a track roller showing a wear pattern of an undercarriage assembly incorporating the subject invention.

With an undercarriage structure 14, wherein the camber angle alternates between a negative angle and a positive angle, as shown in the graphic chart of FIG. 6, the wear life of the track guiding rollers is extended. This is illustrated in FIG. 8, wherein the subject invention will result in the track links 44 being thrust against an outer flange 62 of the rollers 34, 36 approximately 50% operating time, and against an inner flange 64 the remaining 50% of the operating time. This will produce a desirable wear pattern on the tread portions 60 in which substantially the full width of the tread portion 60 is utilized. The original unworn surfaces of the rollers 36, 38 in FIGS. 7 and 8 are shown by dotted lines 66. As shown in FIG. 7, a portion 68 of the original surfaces 66, in the prior art undercarriages, is never utilized.

Figure 9:
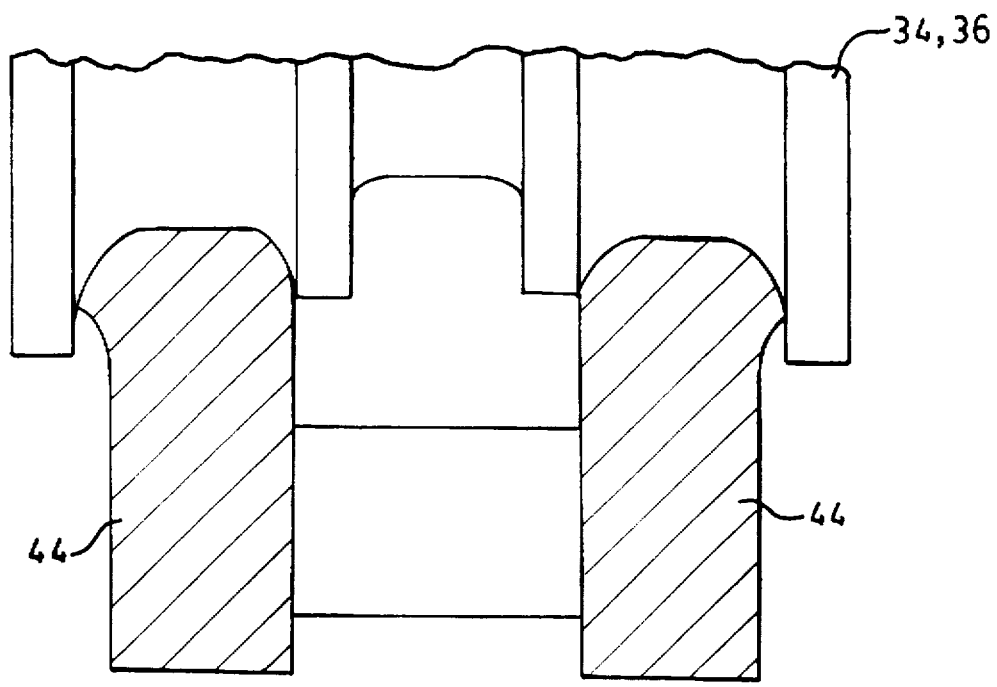
FIG. 9 is a diagrammatic front elevational view, partly in section, of a track roller and mating track links showing a wear pattern of a prior art undercarriage structure.
Figure 10:
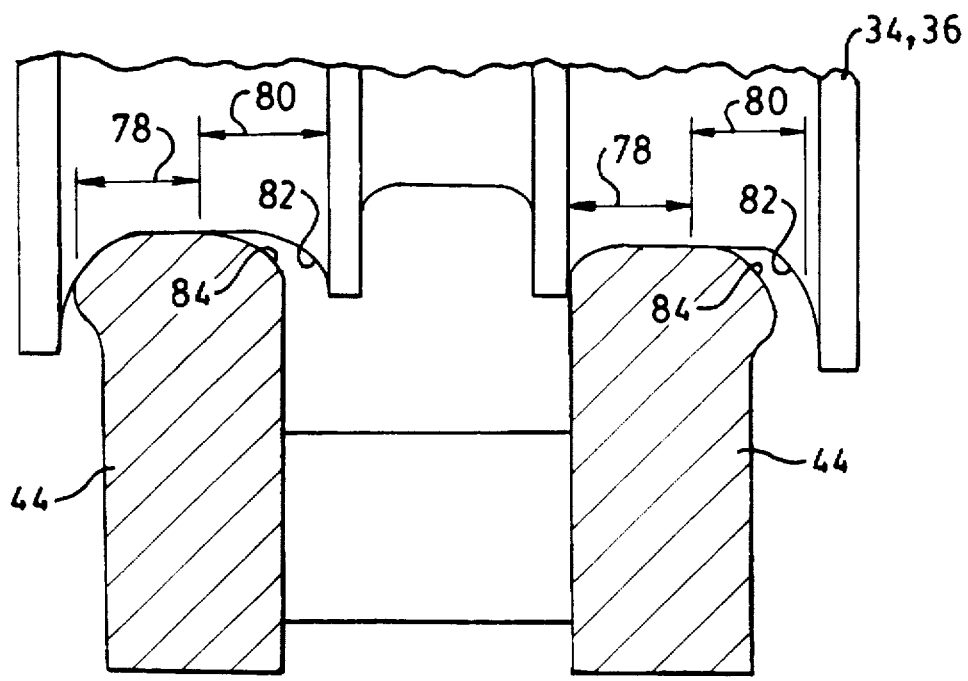
FIG. 10 is a diagrammatic front elevational view, partly in section, similar to FIG. 9, of a track roller and mating track links showing a wear pattern of an undercarriage structure incorporating the subject invention.

With particular reference to FIGS. 9 and 10, some wear patterns between the rollers 36, 38 and the track links 44 are shown. FIG. 9 shows a typical wear pattern of a prior art undercarriage structure wherein the roller frame assemblies are maintained substantially parallel to each other. This wear pattern shows that wear takes place along substantially the entire width of the rollers and the links. FIG. 10 shows a typical wear pattern between a roller 36, 38 and a link 44 of an undercarriage structure 14 incorporating the subject invention. This wear pattern shows wear between the roller 36, 38 and the link 44 in the first contact area 78, which would be produced for example when the machine is travelling in a forward direction. When the machine is operated in a reverse direction, the non-parallelism of the first and second track guiding rollers 36 and 38 with respect to the roller frame assemblies 22, 24 force the rollers 36, 38 against the opposite sides of the lines 44. Wear then takes place between the rollers 36, 38 and the links 44 in the second contact area 80. Because the contacting surfaces between the rollers 36, 38 and the links 44 wear to concave and convex profiles, the wear surfaces will not match 100% as the links 44 shift back and forth in the rollers 36, 38. This results in separate contact areas 78, 80 for forward and reverse operations of the vehicle 10, which results ultimately in increased life of the rollers 36, 38 and the links 44. The wear life is further enhanced if the rollers 36, 38 are initially manufactured new with a concave profile 82, and the links 44 are manufactured new with a convex profile 84. Current designs of rollers and links use flat (cylindrical) contact surfaces.

Industrial Applicability

With reference to the drawings and the previous detailed description, the subject Track-type undercarriage structure 14 is particularly useful for increasing the wear life of certain undercarriage components. With the track guide rollers being positioned in non-parallel relation to and the track roller frame assemblies 22, 24, the track links 44 will contact the rollers 36, 38 at the left or right hand portions as the machine 10 travels in a forward direction. When the vehicle changes to a reverse direction, the non-parallelism of the undercarriage structure 14 forces the links 44 to the opposite side of the rollers 36, 38 to a separate wear area between the links 44 and the rollers 36, 38. The shifting of the links 44 back and forth in the rollers 36, 38 as the vehicle changes directions creates at least two separate and distinct wear areas between the links 44 and the rollers 36, 38. This results in increased wear life of these undercarriage components, even though the contact pressure between the rollers 36, 38 and the links 44 may be increased. Previous testing has shown that there is not a linear relationship between contact pressure and wear rate.

With the alternate embodiment, utilizing the alternating positive and negative camber angles, a similar increase in wear life of the undercarriage components, especially the rollers 36', 38', is increased. As the machine 10, operates, the camber angle will change from negative to positive and the links 44 will run on the tread portion 60 and be adjacent either the inner flanges 64 or the outer flanges 62. The links 44 run back and forth between the outer and inner flanges 62, 64 as the camber angle changes from negative to positive. This utilizes the entire width of the roller tread portion 60 and increases the useful wear life of the undercarriage components.

Other aspects, objects, and advantages of this invention can be obtained from a study of the drawings, the disclosure, and the appended claims.

I claim:

1. A tracked machine having a main frame and an undercarriage structure, said mainframe having first and second sides and a longitudinal centerline, said undercarriage structure including parallel first and second track roller frame assemblies spaced from and adjacent respective first and second sides of said main frame, and a supporting structure connecting each of said track roller frame assemblies to said main frame, the improvement comprising:

a plurality of first track guiding rollers rotatably connected to said first roller frame assembly and a plurality of second track guiding rollers rotatably connected to said second roller frame assembly, each of said first and second track guiding rollers having a fixed axis of rotation with respect to the roller frame assemblies which is substantially non-perpendicular to said longitudinal centerline.

2. A tracked machine, as set forth in claim 1, wherein the axis of rotation of each of said first track guiding rollers is substantially parallel to the axis of each of rotation of said second track guiding rollers.

3. A tracked machine, as set forth in claim 1, wherein the axis of rotation of each of said first track guiding rollers forms a first acute angle "a" with said longitudinal centerline and the axis of each of rotation of said second track guiding rollers forms a second acute angle "b" with said longitudinal centerline, angle "a" being substantially equal to angle "b".

4. An undercarriage structure for a tracked machine having a main frame having first and second sides and a longitudinally extending centerline, said structure comprising:

a first track roller frame assembly positioned adjacent said first side and substantially parallel to said longitudinally extending centerline;

a second track roller frame assembly positioned adjacent said second side and substantially parallel to said longitudinally extending centerline;

a plurality of first track guiding rollers rotatably connected to said first roller frame assembly;

a plurality of second track guiding rollers rotatably connected to said second track roller frame assembly; and each of said first and second track guiding rollers having a fixed axis of rotation with respect to the first and second track roller frame assemblies which is substantially non-perpendicular to said longitudinally extending centerline.

5. An undercarriage structure, as set forth in claim 4, wherein each of first and second track guiding rollers has a tread portion having a concave profile.

6. An undercarriage structure, as set forth in claim 4, including a plurality of track links, each track link having a rail surface having a convex profile.

7. An undercarriage structure for a tracked machine having a main frame having first and second sides and a longitudinally extending centerline, said structure comprising:

a first track roller frame assembly positioned adjacent said first side and substantially parallel to said longitudinally extending centerline;

a second track roller frame assembly positioned adjacent said second side and substantially parallel to said longitudinally extending centerline;

a plurality of first track guiding rollers rotatably connected to said first roller frame assembly;

a plurality of second track guiding rollers rotatably connected to said second track roller frame assembly;

each of said first and second track guiding rollers having a fixed axis of rotation with respect to the first and second track roller frame assemblies which is substantially non-perpendicular to said longitudinally extending centerline; and a first track guiding idler wheel rotatably connected to each of said first and second roller assemblies, each first idler wheel having an axis of rotation which is substantially non-perpendicular to said longitudinally extending centerline.

8. An undercarriage structure, as set forth in claim 7, including a second track guiding idler wheel rotatably connected to each of said first and second roller frame assemblies, each second idler having an axis of rotation which is substantially non-perpendicular to said longitudinally extending centerline.

* * * * *